United States Patent [19]

Itoh et al.

[11] Patent Number: 4,569,254
[45] Date of Patent: Feb. 11, 1986

[54] METHOD FOR CONTROLLING AN ENGINE INSTALLED WITH CONTINUOUSLY VARIABLE TRANSMISSION

[75] Inventors: Hiroshi Itoh, Toyota; Shigeki Hiramatsu, Okazaki; Mitsuru Takada, Toyota, all of Japan

[73] Assignee: Toyota Jidosha Kabushiki Kaisha, Japan

[21] Appl. No.: 612,651

[22] Filed: May 21, 1984

[30] Foreign Application Priority Data

May 23, 1983 [JP] Japan ................. 58-089188

[51] Int. Cl.$^4$ ...................... B60K 41/18; B60K 41/12
[52] U.S. Cl. ........................................ 74/866; 74/860; 74/859; 364/424.1
[58] Field of Search ............... 74/866, 860, 859, 858; 364/424.1; 474/11

[56] References Cited

U.S. PATENT DOCUMENTS 4,291,594 9/1981 Baudoin ........................... 74/866 X
4,295,551 10/1981 Zimmermann et al. .......... 74/866 X
4,515,040 5/1985 Takeuchi et al. ................. 74/860 X Primary Examiner—Leslie A. Braun
Assistant Examiner—Dirk Wright
Attorney, Agent, or Firm—Parkhurst & Oliff

[57] ABSTRACT

A method for controlling an engine using a continuously variable transmission, the method decreases the fuel consumption of the engine in a transient shifting condition. When the operator displaces the accelerator means and the magnitude of the difference between a steady state engine speed, which corresponds to the amount the throttle means of the engine is opened, and a previously detected engine speed differs from a predetermined constant value, the engine speed abruptly increases after a predetermined time elapses and thereafter the engine speed gradually changes to the steady state engine speed. The abrupt increases in the engine speed is a function of a vehicle speed and the amount of the throttle opening.

10 Claims, 6 Drawing Figures

METHOD FOR CONTROLLING AN ENGINE INSTALLED WITH CONTINUOUSLY VARIABLE TRANSMISSION

BACKGROUND OF THE INVENTION

The present invention relates to a method for controlling an engine connected with a continuously variable transmission (hereinafter referred to as CVT), and more particularly to a method for controlling the RPM of the engine during transient shifting conditions.

A CVT has a V-belt extending between a driving and a driven pulley, the driving and/or driven pulley being able to vary the distance between respective axially movable and non-movable members, thereby controlling the size of their respective V-shaped openings which hold the V-belt. This movement controls the revolution ratio (RPM ratio) between the driving and driven pulleys. The size of the V-shaped opening is directly controlled by the amount of hydraulic pressure being fed into or drained from a hydraulic cylinder of either the driving pulley or the driven pulley. Hence, the effective diameter of the pulleys can be varied by changing the amount of hydraulic pressure being fed into or drained from either of the hydraulic cylinders, thereby allowing for a continuously varying ratio of driving pulley diameter to driven pulley diameter. The V-shaped openings on the driving and driven pulleys are each defined by an area between a non-movable portion of the pulley and a movable portion of the pulley, the size of the V-shaped opening being dependent upon the hydraulic pressure inputted to or drained from the hydraulic cylinders. To provide hydraulic pressure to each of the movable pulleys, a hydraulic apparatus, is provided. The above-described CVT has been used because it exhibits very desirable fuel consumption rates and because the desired horsepower transmitted by the engine-CVT combination is a function of an amount of a throttle opening $\theta$ exhibited by a throttle valve, a desirable engine RPM is achieved under steady state conditions ($RPM_e$) such that minimum fuel consumption rates are also achieved.

However, all previously known apparatuses do not adjust the desired engine RPM during transient shifting conditions so that it is different from the desired engine RPM during steady state conditions. Therefore, the amount of time required for the actual engine RPM to obtain the desired engine RPM, when transient shifting conditions are involved, may be undesirably long, thereby impairing the drivability of the vehicle. This impairment is particularly noticeable when the vehicle is required to accelerate. To overcome these disadvantages, a modified method for controlling the engine speed during transient shift conditions was proposed. This modified method utilized the desired engine speed as a function of the amount of throttle opening in a throttle valve. When the throttle valve is opened a large amount, a desired engine speed during a transient shifting condition is determined. This desired engine speed in a transient shifting condition is calculated by multiplying a coefficient "B" by a difference between the desired engine speed under steady state conditions after the change in throttle opening ($RPM_{os}$) and the desired engine speed under steady state conditions before the change in throttle opening ($RPM_{os}'$) i.e., $B \cdot (RPM_{os} - RPM_{os}')$. The coefficient "B" is selected to have a positive value which is less than one. Hence, when the increase in the amount of the throttle opening is large, the engine speed discontinuously increases until it approaches the transient engine RPM, calculated in the above-described manner. After the discontinuous increase in the engine RPM, the engine RPM gradually increases from the transient engine RPM to the desired engine RPM calculated as a function of the amount of change in the throttle opening, $RPM_{os}$.

According to the above-described control of the engine RPM, the desired engine speed in the transient shifting condition can smoothly increase. This effects a smooth increase in the acceleration of a vehicle. However, the coefficient B of the above-described control is always a fixed value independent of the velocity of the vehicle or the amount that a throttle valve is opened after the throttle opening has been changed. Hence, the following disadvantages occur. If the coefficient B has a high value suitable for a large vehicle velocity or a large amount of throttle opening after the amount of the throttle opening has changed, the engine speed, $RPM_e$, does not increase as much when the vehicle operates at a low velocity or when the throttle opening, after the change of the throttle opening, is relatively small. This substantially impairs the acceleration of the vehicle. Conversely, if the coefficient "B" has a low value suitable for a low velocity or a small throttle opening after the change of the throttle opening is made, the amount of increase in the engine RPM from the desired engine RPM before the change in the throttle opening, to the engine RPM in the transient condition becomes small, thereby resulting in a substantial amount of time to reach the desired engine speed after the change of the throttle opening is made. This also substantially impairs the acceleration of a vehicle.

SUMMARY OF THE INVENTION

The present invention was made in view of the foregoing background and to overcome the foregoing drawbacks. It is accordingly an object of this invention to provide a method for controlling a RPM of an engine which is connected to a continuously variable transmission to improve the drivability of a vehicle.

To attain the above objects, a method for controlling an engine RPM of a vehicle equipped with a continuously variable transmission comprises the steps of:

detecting a change in an amount of throttle opening in a throttle means on the engine;

detecting a velocity of the vehicle;

detecting an actual RPM of the engine;

selecting an intermediate engine RPM as a desired engine RPM in a transient shifting condition, and changing the detected acutal RPM to the selected intermediate RPM when the continuously variable transmission is in the transient shifting condition, the transient shifting condition being generated by the change in an amount of throttle opening, the selected intermediate engine RPM being intermediate in value between a desired engine RPM under steady state conditions given the detected change in throttle opening, the detected actual RPM and the detected velocity of the vehicle; and gradually changing the selected intermediate engine RPM to the desired steady state RPM determined by the amount of throttle opening.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
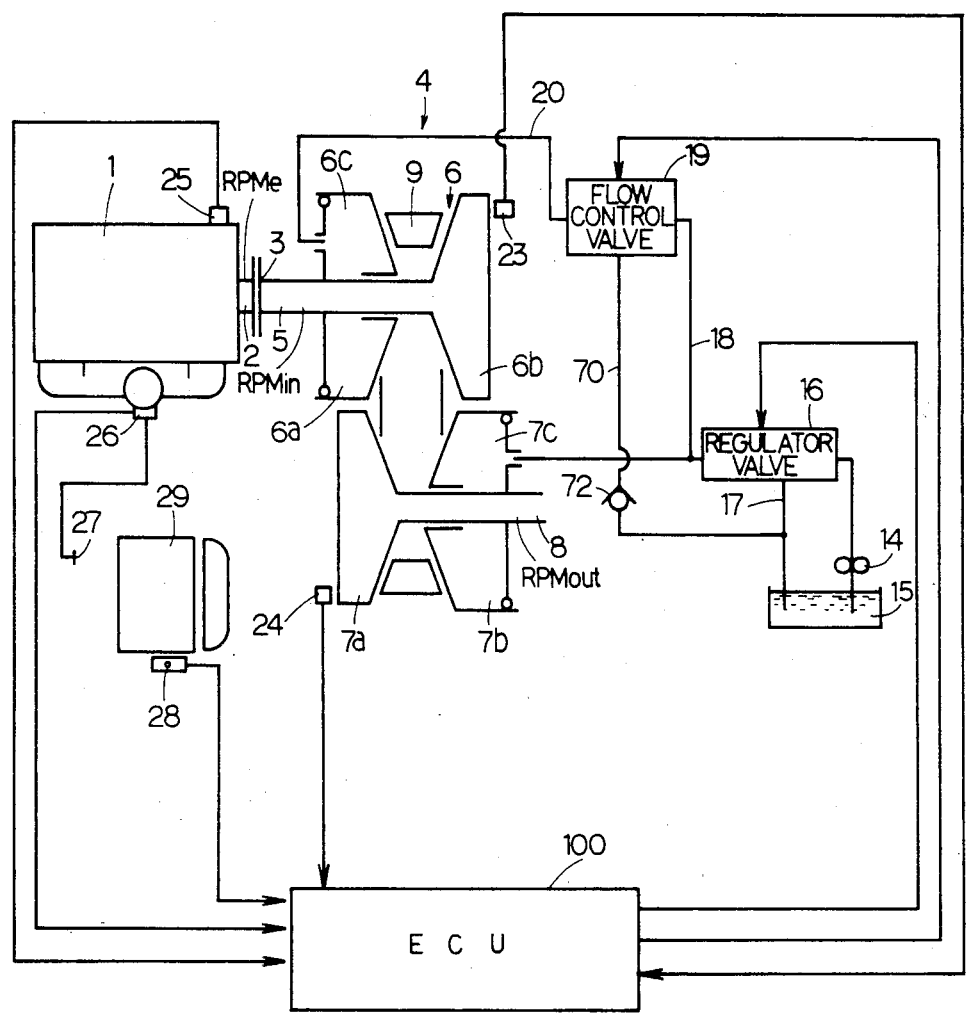
FIG. 1 is a schematic view of a hydraulic apparatus utilizing the method of the present invention.

FIG. 1 illustrates a schematic view of a hydraulic apparatus employing the method of the present invention. An engine 1 is operably connected through a crank shaft 2 and a clutch 3 with a shaft 5. The shaft 5 is an input shaft connected with a CVT 4. The CVT 4 includes pulleys 6 and 7. The pulley 6 is a driving pulley mounted on the driving and input shaft 5, which is driven by the engine 1. The pulley 7 is a driven pulley, mounted on a driven and output shaft 8. The torque of the shaft 8 is outputted to wheels of a vehicle (not shown in drawings). A torque transmitting continuous V-belt 9 extends between the pulleys 6 and 7. The driving pulley 6 has a movable member 6a, which is axially displaced on and rotatable with the input shaft 5, and a fixed member 6b, which is fixed to and rotatable with the input shaft 5. The movable member 6a is axially displaced upon the input shaft 5 by the pressure exerted upon it by a hydraulic cylinder 6c. When the movable member 6a is axially displaced in a direction toward the fixed member 6b, the width defined between the members 6a and 6b is decreased. This width is directly controlled by the amount of hydraulic fluid supplied to the hydraulic cylinder 6c by the flow control valve 19. This results in an increased effective diameter of the driving pulley 6. As a result, the transmission RPM ratio "e", i.e. (the rotating speed of the driven pully 7)/(the rotating speed of the driving pulley 6, $RPM_{out}/RPM_{in}$) is increased. The $RPM_{in}$ is governed by the engine RPM which is represented by $RPM_e$. When hydraulic fluid is drained from the cylinder 6c, through the flow control valve 19, the transmission RPM ratio is decreased.

Similarly, the driven pulley 7 has a movable member 7b, which is axially displaced on and rotatable with the output shaft 8, and a fixed member 7a, which is fixed to and rotatable with the output shaft 8. The movable member 7b is axially displaced by the pressure exerted upon it by a hydraulic cylinder 7c. When the movable member 7b is axially displaced in a direction toward the fixed member 7a, the width defined between the members 7a and 7b is decreased. This results in an increased effective diameter of the driven pulley 7.

To minimize the amount of engine power consumed by a hydraulic fluid pump 14, the hydraulic pressure in the hydraulic cylinder 7c is controlled to be as small as possible while maintaining a necessary pressure to prevent the belt 9 from slipping while rotating around the driving pulley 6 and the driven pulley 7. The hydraulic pressure in the hydraulic cylinder 6c is varied to adjust the RPM ratio. The amount of pressure in the hydraulic cylinder 6c is designed to be smaller than that of the hydraulic pressure in the hydraulic cylinder 7c. However, even though the value of the hydraulic pressure supplied to the hydraulic cylinder 6c is less than the value of the hydraulic pressure supplied to the hydraulic cylinder 7c, the system is designed so that a greater overall hydraulic pressure is realized in the hydraulic cylinder 7c than in the hydraulic cylinder 6c because the cylinder 6c has a larger area acted upon by the hydraulic pressure than that of the hydraulic cylinder 7c. Hence, it is possible to obtain a RPM ratio of greater than or at least equal to one.

The CVT 4 is supplied with hydraulic fluid by using the following procedure. A hydraulic fluid pump 14, driven by a motor, pumps hydraulic fluid from a reservoir 15 to a regulator valve 16. The regulator valve 16 controls the pressure supplied to a hydraulic fluid passage 18 by adjusting an amount of fluid drained from the system, thereby generating a specific line pressure $P_L$ in the hydraulic fluid passage 18. The regulator valve 16 supplies the line pressure $P_L$ through the hydraulic fluid passage 18 to the hydraulic cylinder 7c of the driven pulley 7 and to a flow control valve 19. The flow control valve 19 is a three port connection valve, and includes an inlet port communicated with the passage 18, a drain port communicated with a drain passage 70 and an outlet port communicated through a hydraulic fluid passage 10 with the hydraulic cylinder 6c of the driving pulley 6. When the flow control valve 19 is in a first position, the inlet port communicates with the outlet port. When the flow control valve 19 is in a second position, there is no communication between the three ports. Finally, when the flow control valve 19 is in a third position, the outlet port communicates with the drain port. A check valve 72 is provided on the drain passage 70. The check valve 72 only allows hydraulic fluid to flow in a single direction, from the flow control valve 19 to the hydraulic fluid reservoir 15.

A sensor 23 detects the rotating speed $RPM_{in}$ of the driving pulley 6. A sensor 24 detects the rotating speed $RPM_{out}$ of the driven pulley 7. An engine coolant temperature sensor 25 is mounted adjacent a cylinder block of the engine 1 and detects the temperature of the engine coolant. A throttle opening sensor 26 detects an amount that a throttle valve is opened, which is varied in proportion to a stroke of an accelerator pedal 27, installed adjacent to a passenger seat 29. A sensor 28, mounted near the passenger seat 29, detects the position of a shift lever of the transmission. In the case of an automatic transmission, the sensor 28 detects the shift range of the transmission.

The signals detected by the foregoing sensors are inputted to an electronic control unit 100 (hereinafter referred to as ECU). The ECU 100 outputs a control signal to the regulator valve 16 and the flow control valve 19.

When the hydraulic pressure in the hydraulic cylinder 7c of the movable member 7b of the driven pulley 7 increases, the movable member 7b is axially displaced upon the output shaft 8 toward the fixed member 7a.

This axial displacement results in contact points between the driven pulley 7 and the belt 9 moving toward points which are positioned toward outer peripheral portions on the driven pulley 7. The amount of pressure $P_L$ is controlled so that it does not result in any significant amount of slip between the belt 9 and the driven pulley 7. When the hydraulic pressure in the hydraulic cylinder 6c of the driving pulley 6 increases, the movable member 6a of the driving pulley 6 is axially displaced upon the input shaft 5 toward the fixed member 6b. This axial displacement similarly results in contact points between the driving pulley 6 and the belt 9 moving toward points which are positioned toward outer peripheral portions on the driving pulley 6. Thus, the transmission RPM ratios between the driving and driven pulleys are controlled.

Figure 2:
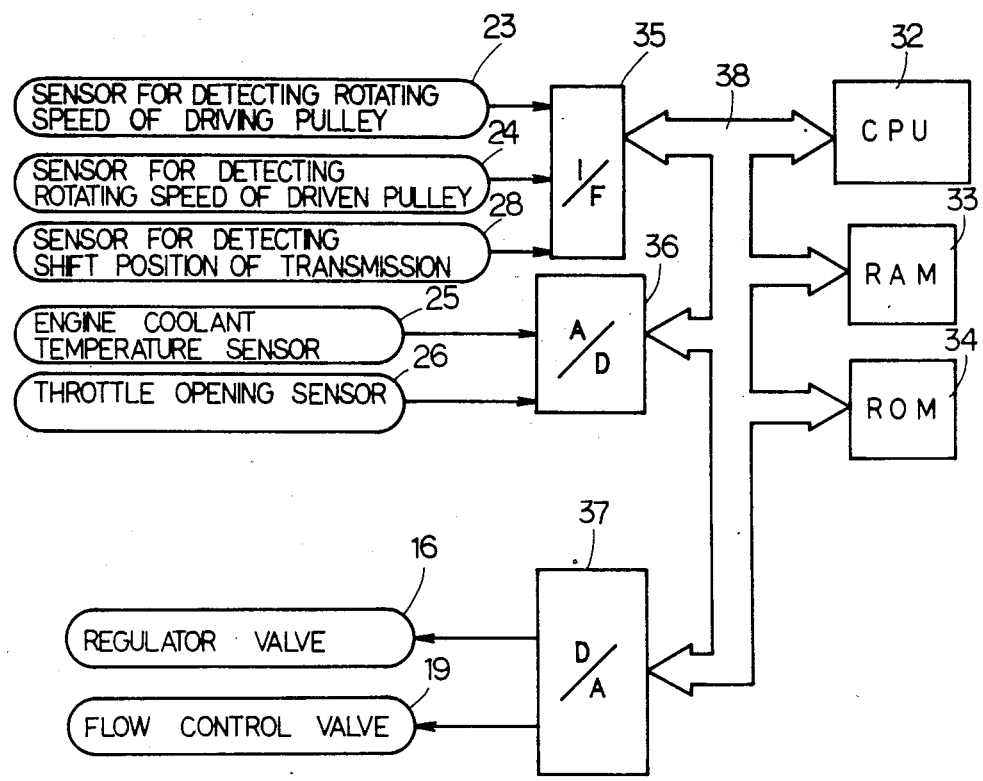
FIG. 2 is a circuit diagram of an electronic control unit employed in the present invention.

The ECU 100 controls the regulator valve 16 and the flow control valve 19 in accordance with the signals detected by the various sensors. FIG. 2 shows that the ECU 100 functions as a digital computer, and has a central processing unit 32 (hereinafter referred to as CPU) which carries out arithmetic and logic processing functions, an inter-face 36 (hereinafter referred to as I/F), an analog-digital converter 36 (hereinafter referred to as A/D), a random-access memory 33 (hereinafter referred to as RAM) which temporarily stores the calculated data of the CPU 32, a read-only memory 34 (hereinafter referred to as ROM) which stores a predetermined control program and arithmetic constants therein, and a digital-analog converter 37 (hereinafter referred to as D/A) 37. They are connected by a common bus 38. An example of how the ECU 100 functions is given by the following. The I/F 35 receives an output signal from the sensor 23, corresponding to a rotating speed of the driving pulley 6 ($RPM_{in}$), an output signal from the sensor 24 corresponding to a rotating speed of the driven pulley 7 ($RPM_{out}$), and an output from the shift position sensor 28. The A/D 36 receives the output signals from the engine coolant temperature sensor 25 and the throttle opening sensor 26. The CPU 32, a microprocessor, then compares the outputs received against any stored information, and issues an output to the D/A 37, which then subsequently outputs any appropriate instructions to the regulator valve 16 and the flow control valve 19.

Figure 3:
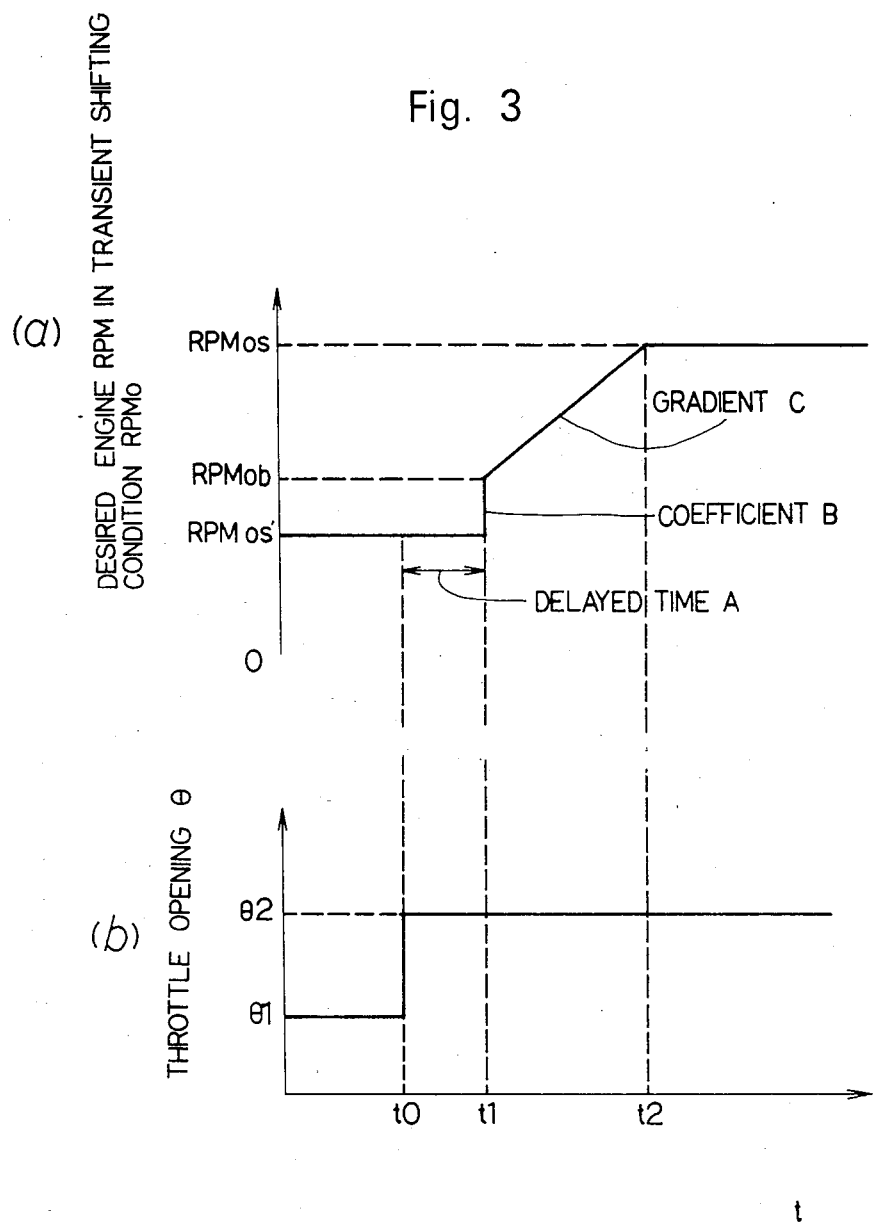
FIG. 3 is a graph showing the relation between the desired engine speed in the transient shifting condition and the throttle opening according to a lapse of time during the acceleration stage.
Figure 5:
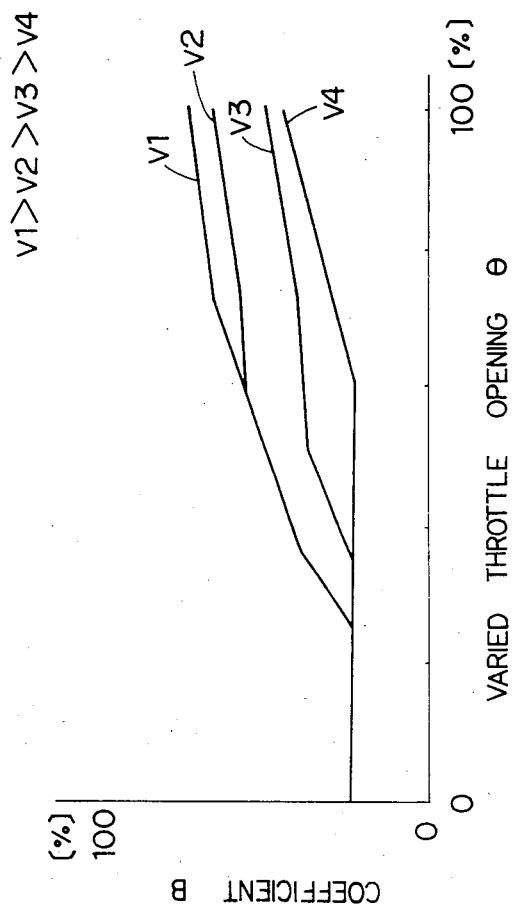
FIG. 5 is a graph showing the relation between the coefficient B of the engine speed and the throttle opening.

The ROM memory means 34 works in conjunction with the CPU data processing means 32 in the following manner: The ROM 34 stores data relating to the desired engine speed in a transient shifting condition and data relating to the amount of throttle opening, as shown in FIGS. 3 and 5, respectively. The CPU data processing means 32 compares the actual operating conditions to the data stored in the ROM 34, and if appropriate, outputs a signal which results in the regulator valve 16 and the flow control valve 19 being controlled.

According to the method of the present invention for controlling the engine RPM, the requisite horsepower of the engine 1 is a function of an amount of throttle opening $\theta$ in a fuel intake system, and the desired engine RPM is given a particular value when the requisite horsepower of the engine 1 is obtained for a minimum fuel consumption rate. Hence, the desired engine RPM, represented by $RPM_{ins}$, is a function of the amount of throttle opening $\theta$. The desired transmission speed ratio $e_s$ under steady state conditions, is defined by a ratio $RPM_{out}/RPM_{ins}$. The reference $RPM_{out}$ is the actual rotating speed of the output shaft 8 of the driven pulley 7. Under steady state conditions of the CVT, the flow control valve 19 is controlled so that the rotating speed $RPM_{in}$, of the input shaft 5 is the same as the desired engine RPM, $RPM_{ins}$, of the input shaft 5, and therefore, the transmission speed ratio e can be same as the desired transmission speed ratio $e_s$.

FIG. 3(a) illustrates a relationship between a desired engine speed RPM ($RPM_o$) in a transient shifting condition of the engine-CVT combination and a time "t" occurring during the acceleration stage.

FIG. 3(b) illustrates a relationship between the amount of throttle opening $\theta$ in a fuel intake system and a time "t" occurring during the acceleration stage. The throttle opening $\theta$ instantaneously increases from a value $\theta_1$ to a value $\theta_2$ when the amount of elapsed time equals $t_o$. The ECU 100 compares a desired engine RPM, ($RPM_{os'}$), which corresponds to a throttle opening of $\theta_1$, with a desired engine RPM, ($RPM_{os}$), which corresponds to a throttle opening of $\theta_2$. If the results of the comparison are within the scope defined by following equation:

$$|RPM_{os} - RPM_{os'}| \geq \Delta RPM_a \quad (1)$$

where, $\Delta RPM_a$ is a predetermined constant and the magnitude of the difference between $RPM_{os}$ and $RPM_{os'}$ is compared with $\Delta RPM_a$. Then the desired engine speed in a transient shifting condition ($RPM_{os'}$) varies as indicated by the solid line shown in FIG. 3(a). This variation is further discussed below.

$$t_0 \leq t < t_1 \quad (2)$$

When the time "t" is the value somewhere between $t = t_0$ and $t < t_1$, i.e., $t_0 \leq t < t_1$, then the desired engine speed in the transient shifting condition ($RPM_o$) is maintained such that $RPM_o$ is equal to $RPM_{os'}$, during a time period represented by "A". For example, "$t_1$" is a value somewhere between 0.2 seconds or 0.3 seconds.

$$t = t_1 \quad (6)$$

When the time "t" is represented by $t = t_1$, the desired engine speed in the transient shifting condition ($RPM_o$), increases until it is equal to a desired intermediate value ($RPM_{ob}$) where $RPM_{ob}$ is determined by the following equation:

$$RPM_{ob} = RPM_{os'} + B(RPM_{os} - RPM_{os'})$$

where, B equals a predetermined coefficient; $0 < B < 1$. The value of the predetermined coefficient B varies according to the amount of the throttle opening $\theta$ and the velocity of the vehicle, as shown in FIG. 5.

Hence, the following inequality occurs:

$$RPM_{os'} < RPM_{ob} < RPM_{os}$$

$$t_1 < t < t_2 \quad (c)$$

When the time "t" continues from $t_1$ to $t_2$, the desired engine speed in the transient shifting condition ($RPM_o$) gradually approaches the value of $RPM_{os}$. In this condition, $$RPM_o = RPM'_o + C_1(RPM_{os} - RPM_{os'}) \pm C_2 \quad (2)$$

Where; $RPM'_o$ corresponds to a previously calculated $RPM_o$, which is continuously reinserted into equation (2) so that a progressive change in the engine RPM can be realized. The first relationship (2) results in a different engine RPM approximately every few seconds; $RPM_{os}$ is the desired engine speed under steady state conditions when the throttle opening is defined by $\theta_2$; $C_1$ and $C_2$ are constants. Note that when the time "t" is equal to $t_1$, $RPM_o$ instantaneously increases from $RPM_{os}$, to $RPM_{ob}$ and when the time "t" is equal to $t_2$, $RPM_o$ linearly increases from $RPM_{ob}$ to $RPM_{os}$.

The ECU 100 determines whether the operator of the vehicle has depressed and the accelerator pedal and therefore would require an increase in the engine RPM during a time period "A" between $t=t_0$ and $t=t_1$. If the operator does not displace the accelerator pedal 27 during the time period "A", the ECU 100 does not increase the engine RPM ($RPM_e$) and stops any increase in the engine RPM ($RPM_e$).

However, when the results of the comparison made by the ECU 100 are not within the scope of the first relationship (1), but are within the scope of the following equation (3), then the desired engine speed in a transient shifting condition ($RPM_o$) is increased in accordance with the following second relationship (4).

$$|RPM_{os} - RPM_{os'}| < \Delta RPM_a \quad (3)$$

$$RPM_o = RPM'_o + D_1(RPM_{os} - RPM_{os'}) \pm D_2 \quad (4)$$

Where, $RPM'_o$ corresponds to a previously calculated $RPM_o$ which is continuously reinserted into equation (4) so that a progressive change in the engine RPM can be realized. Equation (4) results in a different engine RPM approximately every few seconds; $RPM_{os}$ is the desired engine speed under steady state conditions when the throttle opening is defined by $\theta_2$; $D_1$ and $D_2$ are constants; and $D_1(RPM_{os} - RPM_{os'}) \pm D_2$ is defined by the following equation (5):

$$D_1(RPM_{os} - RPM_{os'}) \pm D_2 = (RPM_{os} - RPM_{os'})/100 \quad (5)$$

where $D_1$ and $D_2$ are determined so that $RPM_o$ in equation (4) can be gradually varied until a value equal to $RPM_{os}$ is achieved.

Figure 4:
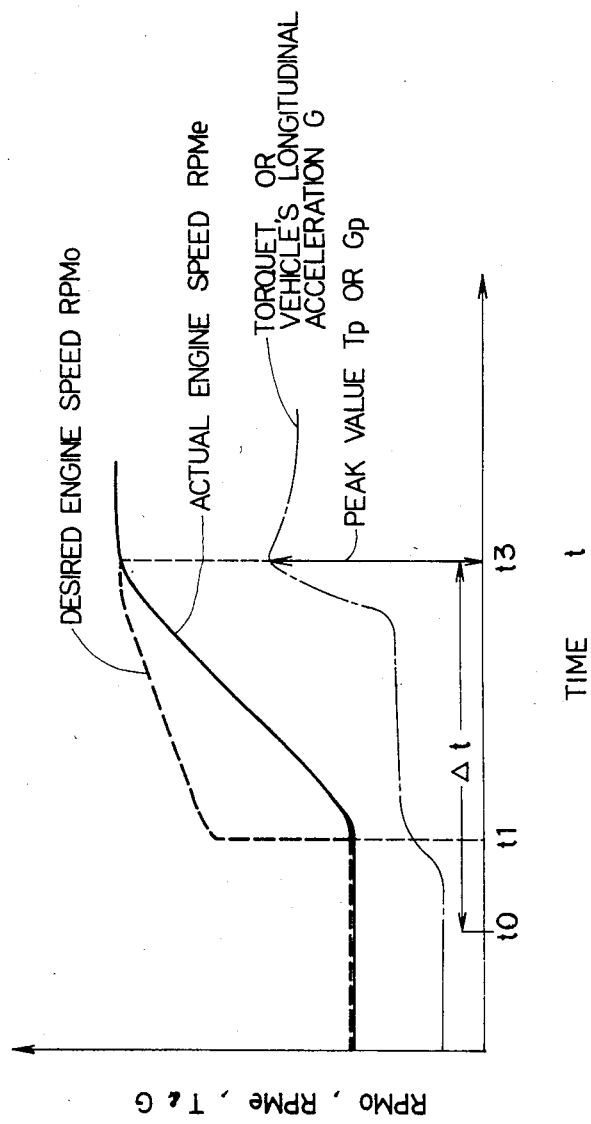
FIG. 4 is a graph showing the relation between the desired engine speed, actual engine speed and torque in the transient shifting condition according to a lapse of time during the acceleration stage.

FIG. 4 illustrates a relationship showing the change in the actual engine RPM ($RPM_e$) in a transient shifting condition, according to a lapse of time t. When the throttle opening $\theta$ increases at the time $t_o$, the control of the transient engine RPM control begins. Because the increased horsepower of the engine 1, generated by the depressed stroke of the accelerator pedal 27, is consumed by accelerating the CVT 4, the torque T of the driven shaft 8 gradually increases and begins to rapidly accelerate the vehicle at $t \approx t_3$, as shown by the chain line in FIG. 4. At the time $t_3$, the torque T of the driven shaft 8 and a vehicle's longitudinal acceleration G, each reach maximum values $T_P$ and $G_P$, respectively. The reference $\Delta t$ is defined as the time between $t=t_o$ and $t=t_3$. The desired engine speed $RPM_o$ at the time $t_3$ varies according to the value of the coefficient B. It is possible to change the values of $T_P$, $G_P$ and $\Delta t$ by substituting in different values for the coefficient B. According to the present invention, the values of $T_P$, $G_P$ and $\Delta t$ are determined to have optimum values in view of the vehicle speed V and the amount of varied throttle opening $\theta$. Hence, the value of the coefficient B is determined so that an optimum acceleration of the vehicle may be obtained.

FIG. 5 shows the relation between the varied throttle opening $\theta$ and the coefficient B, according to four different velocities of the vehicle. In FIG. 5, the four velocities satisfy the following relationship:

$$V_1 > V_2 > V_3 > V_4$$

The abscissa represents "varied throttle opening $\theta$", but it could also represent a difference $\Delta\theta$ between the varied throttle opening and the previously detected throttle opening before any variation in throttle opening occurs.

When the velocity of the vehicle increases or when the varied throttle opening $\theta$ increases, the coefficient B also increases. However, according to the type or make of a vehicle or engine, the coefficient B may decrease when the velocity of the vehicle or the varied throttle opening $\theta$, increases. The coefficient B is designed to have a maximum value corresponding to a fully opened throttle opening ($\theta = 100\%$) to result in acceleration of the vehicle.

Figure 6:
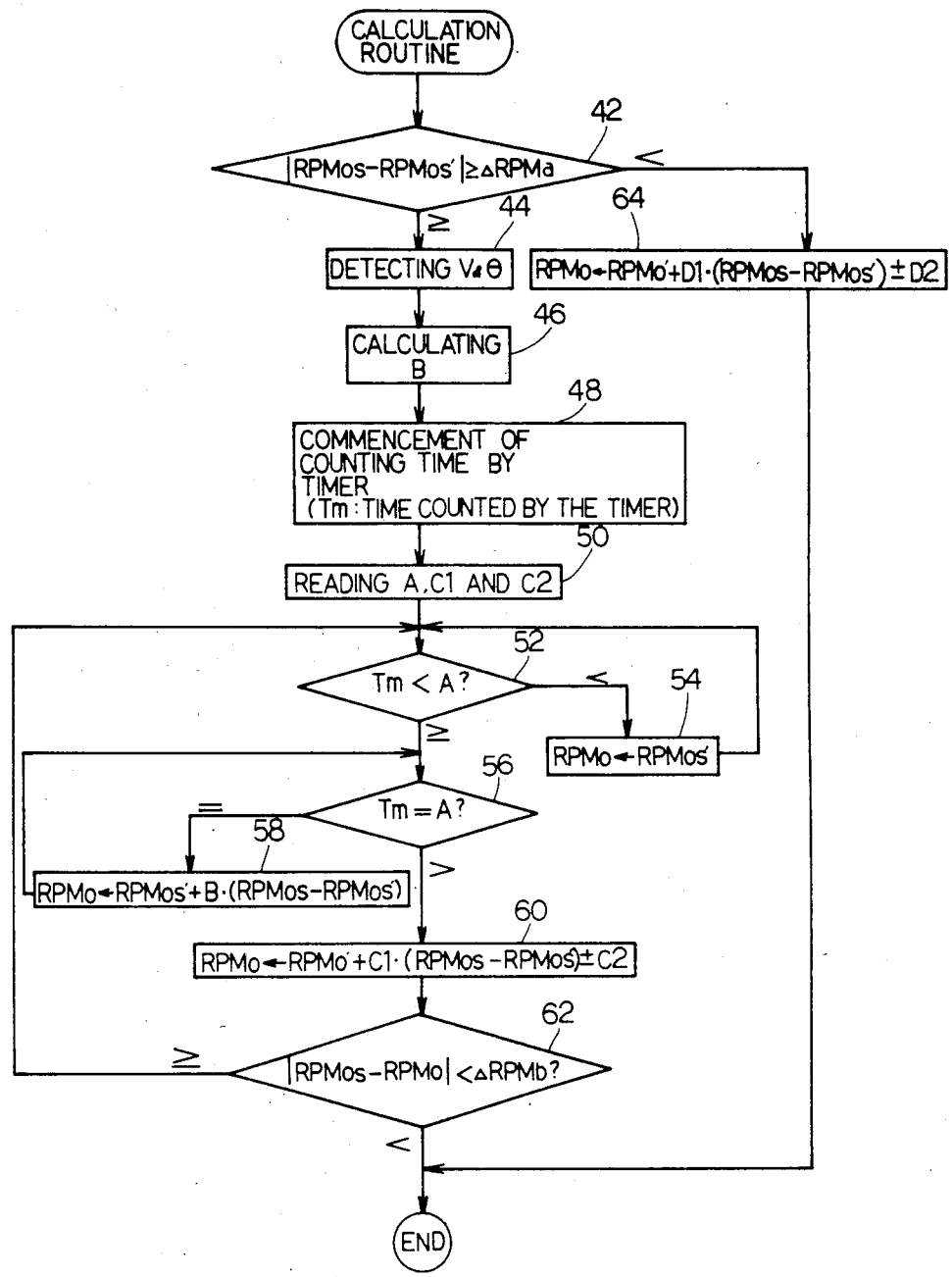
FIG. 6 is a flow chart illustrating a calculation routine according to the present invention.

FIG. 6 shows a flow chart illustrating the operation of the program according to the present invention. This program is an interruption program which begins after a prescribed timing signal is issued. The ECU 100 beings the program when the vehicle's main power switch is turned on.

In a first step 42, the determination is made of whether $|RPM_{os} - RPM_{os'}|$ is greater than or equal to $\Delta RPM_a$. Here, $RPM_{os}$ is the desired engine RPM under steady state conditions when the throttle opening is varied by the amount $\theta$. $RPM_{os'}$ is the desired engine RPM under steady state conditions before any change in the amount of throttle opening has occurred. If $|RPM_{os} - RPM_{os'}|$ is greater than or equal to $\Delta RPM_a$, the program proceeds to a step 44. When $|RPM_{os} - RPM_{os'}|$ is greater than or equal to $\Delta RPM_a$, the amount of throttle opening $\theta$ is large. Conversely, if $|RPM_{os} - RPM_{os'}|$ is less than $\Delta RPM_a$, the program proceeds to a step 64. When $|RPM_{os} - RPM_{os'}|$ is less than $\Delta RPM_a$, the amount of throttle opening $\theta$ is much smaller. In the step 44, the velocity of the vehicle and the varied throttle opening $\theta$ are detected. The program proceeds to a step 46, wherein the value of the coefficient B is calculated from the graph shown in FIG. 5, by using the detected value for the velocity of the vehicle (V) and the varied throttle opening $\theta$. Different values for the coefficient B are stored with related typical vehicle velocities V and typical varied throttle openings $\theta$ in the memory of the device to minimize the amount of data needed to be stored in the memory. If the detected values of the vehicle velocity V and varied throttle opening $\theta$ are not found in the memory, the precise value of the coefficient B is calculated from the data map shown in FIG. 5, by a proportional calculation. The program proceeds to a step 48. In the step 48, a timer begins to count an amount of elapsed time. The program proceeds to a step 50. In the step 50, values for the time period "A", constants C1 and C2 are read from the memory. The value, $[C1 \cdot (RPM_{os} - RPM_{os'}) \pm C2]$ describes the line referred to as "Gradient C" in FIG. 3(a). The program proceeds to a step 52, wherein the determination is made of whether the amount of time $T_m$ counted by the timer is greater than the timer period "A". If the time $T_m$ on the timer is less than the time period "A", the program proceeds to a step 54. If the time $T_m$ counted on the timer is greater than or equal to the time period "A", the program proceeds to a step 56. In the step 54, the value $RPM_{os}$, is substituted for the desired engine speed RPM, $RPM_o$, and the program returns to the step 52. In the step 56, the determination is made of whether the amount of time $T_m$ counted by the timer, is equal to the time period "A". If the amount of time $T_m$ counted by the timer is equal to the time period "A", the program proceeds to a step 58. If the amount of time $T_m$ counted by the timer is greater than the time period "A", the program proceeds to a step 60. In the step 58, the value $[RPM_{os'} + B \cdot (RPM_{os} - RPM_{os'})]$ is substituted for the desired engine RPM, $RPM_o$, and the program returns to the step 56. In the step 60, the desired engine RPM, $RPM_o$, changes by an amount $[C1 \cdot (RPM_{os} - RPM_{os'}) \pm C2]$. The program proceeds to a step 62. In the step 62, the determination is made of whether the absolute value $|RPM_{os} - RPM_o|$ is less than the predetermined value $\Delta RPM_b$. If the absolute value $|RPM_{os} - RPM_o|$ is greater than or equal to the predetermined value $\Delta RPM_b$, the program returns to the step 52. However, when the absolute value $|RPM_{os} - RPM_o|$ is less than the value $\Delta RPM_b$, the program ends. When the absolute value $|RPM_{os} - RPM_o|$ is less than the predetermined value $\Delta RPM_b$, this means that the desired engine RPM, $RPM_o$ has a value which is approximately equal to the value $RPM_{os}$. In the step 64, the value $[RPM_o + D1 \cdot (RPM_{os} - RPM_{os'}) \pm D2]$ is substituted for the desired engine RPM, $RPM_o$.

While the present invention has been described in its preferred embodiments, it is to be understood that the invention is not limited thereto, and may be otherwise embodied within the scope of the following claims.

What is claimed is:

1. A method for controlling the RPM of an engine in a motor vehicle using a continuously variable transmission, the transmission having a driving pulley comprising a fixed member and a movable member, the movable member being actuated by a hydraulic cylinder to form a V-shaped opening between the movable member and the fixed member, a driven pulley mounted on an output shaft with another fixed member and another movable member, said another movable member being similarly actuated by another hydraulic cylinder to form another V-shaped opening between said another movable member and said another fixed member and an endless belt member spanning the pulleys so that different transmission ratios can be obtained, the method comprising the steps of:

detecting a change in an amount of throttle opening in a throttle means on the engine;
   detecting a velocity of the vehicle;
   detecting an actual RPM of the engine;
   selecting an intermediate engine RPM as a desired engine RPM in a transient shifting condition, and changing the detected actual RPM to the selected intermediate RPM when the continuously variable transmission is in said transient shifting condition, the transient shifting condition being generated by the change in an amount of throttle opening, the selected intermediate engine RPM being intermediate in value between a desired engine RPM under steady state conditions given the detected change in throttle opening, the detected actual RPM and the detected velocity of the vehicle; and
   gradually changing the selected intermediate engine RPM to the desired steady state RPM determined by the amount of throttle opening.

2. The method of claim 1, wherein the selected intermediate RPM increases when the amount of change in the throttle opening increases.

3. The method of claim 2, wherein the selected intermediate RPM increases when the detected vehicle velocity increases.

4. The method of claim 1, wherein the method further comprises:
   changing the actual engine RPM immediately after the change in amount of throttle opening to an intermediate RPM which is between the steady state desired RPM and the actual RPM, the change of the desired engine RPM occurring after a predetermined lapse of time, whenever the magnitude of the difference between the actual RPM and the steady state desired RPM is not less than a predetermined value in accordance with a first relationship.

5. The method of claim 3, wherein the method further comprises:
   changing the actual engine RPM immediately after the change in amount of throttle opening to an intermediate RPM which is between the steady state desired RPM and the actual RPM, the change of the desired engine RPM occurring after a predetermined lapse of time, whenever a magnitude of the difference between the actual RPM and the steady state desired RPM is not less than a predetermined value, in accordance with a first relationship.

6. The method of claim 1, wherein the desired engine RPM at a transient state changes linearly from the selected intermediate RPM to the steady state desired RPM.

7. The method of claim 1, wherein the desired engine RPM at a transient state changes linearly from the selected intermediate RPM to the steady state desired RPM.

8. The method of claim 4, wherein the desired engine RPM at a transient state changes linearly from the selected intermediate RPM to the steady state desired RPM.

9. The method of claim 5, wherein the desired engine RPM at a transient state changes linearly from the selected intermediate RPM to the steady state desired RPM.

10. The method of claim 1, wherein the method further comprises: progressively changing the actual engine RPM to a calculated engine RPM in accordance with a second relationship, whenever a magnitude of the difference between the actual RPM and the steady state desired RPM is less than a predetermined value.

* * * * *